United States Patent
Hodge

(10) Patent No.: US 7,475,894 B2
(45) Date of Patent: Jan. 13, 2009

(54) REAR SUSPENSION ASSEMBLY FOR A DRAG RACING VEHICLE

(76) Inventor: Christopher D. Hodge, 362 Cooper Rd., Rutledge, TN (US) 37861

( * ) Notice: Subject to any disclaimer, the term of this patent is extended or adjusted under 35 U.S.C. 154(b) by 24 days.

(21) Appl. No.: 11/772,303

(22) Filed: Jul. 2, 2007

(65) Prior Publication Data

US 2008/0007021 A1 Jan. 10, 2008

Related U.S. Application Data

(60) Provisional application No. 60/806,552, filed on Jul. 5, 2006.

(51) Int. Cl.
*B60G 9/02* (2006.01)
(52) U.S. Cl. .................. 280/124.116; 280/124.128; 280/124.156
(58) Field of Classification Search .......... 280/124.1, 280/124.11, 124.109, 124.116, 124.128, 280/124.153, 124.156
See application file for complete search history.

(56) References Cited

U.S. PATENT DOCUMENTS

| | | | | |
|---|---|---|---|---|
| 2,266,280 | A * | 12/1941 | Sherman | 267/254 |
| 3,466,058 | A * | 9/1969 | King | 280/124.11 |
| 5,000,476 | A * | 3/1991 | Lindorfer et al. | 280/124.107 |
| 5,108,127 | A * | 4/1992 | Chandler | 280/5.5 |
| 5,333,896 | A * | 8/1994 | Creighton | 280/124.156 |
| 5,364,121 | A * | 11/1994 | Lee | 280/124.164 |
| 5,499,689 | A * | 3/1996 | Johnson | 180/16 |
| 5,803,200 | A * | 9/1998 | Brandt | 180/348 |
| 6,167,361 | A * | 12/2000 | Bristow et al. | 703/8 |
| 6,357,768 | B1 * | 3/2002 | Chan et al. | 280/124.106 |
| 6,619,673 | B2 * | 9/2003 | Eckelberry et al. | 280/6.151 |
| 6,698,775 | B2 * | 3/2004 | Ness | 280/86.757 |
| 2002/0180170 | A1 * | 12/2002 | Anderson | 280/124.128 |
| 2006/0017256 | A1 * | 1/2006 | Hupperich, Jr. | 280/124.156 |

OTHER PUBLICATIONS

Applied Racing Technology, Catalog pages of rear suspension, http://www.appliedracing.com, Jun. 24, 2007, 3 pages.

* cited by examiner

*Primary Examiner*—Eric Culbreth
*Assistant Examiner*—Joseph Rocca
(74) *Attorney, Agent, or Firm*—Knox Patents; Thomas A. Kulaga

(57) ABSTRACT

A rear suspension assembly for a drag racing vehicle in which the assembly includes a plurality of links with a brace assembly connecting a pair of links. The links provide a connection between the vehicle chassis and the rear axle housing. The brace assembly is attached to two links on opposite sides of the drive shaft, thereby maintaining the two links in a fixed spatial relationship. In one embodiment, the brace assembly includes members arranged in an X-shape, with the outboard ends of the X-shape attached to the distal ends of two links. In one such embodiment, the cross-brace assembly includes a cross-brace extending from the medial section of one link to the medial section of the opposite link and the cross-brace is connected to the center of the X-shaped brace. In another embodiment, the brace assembly includes members in a Y-shape in conjunction with members bridging the two links.

20 Claims, 3 Drawing Sheets

REAR SUSPENSION ASSEMBLY FOR A DRAG RACING VEHICLE

CROSS-REFERENCE TO RELATED APPLICATIONS

This application claims the benefit of U.S. Provisional Application Ser. No. 60/806,552, filed Jul. 5, 2006.

STATEMENT REGARDING FEDERALLY SPONSORED RESEARCH OR DEVELOPMENT

Not Applicable

BACKGROUND OF THE INVENTION

1. Field of Invention

This invention pertains to a rear suspension assembly for a drag racing vehicle. More particularly, this invention pertains to rear suspension assembly that includes members that stabilize the rear axle of a vehicle.

2. Description of the Related Art

Drag racing vehicles have unique requirements compared to oval or round track race vehicles or street vehicles. Not only must a drag racing vehicle have sufficient horsepower to win races, but that horsepower must be efficiently transferred into forward motion through the rear tires. Many factors contribute to the dynamic response of a drag racing vehicle during a run. The tuning of the rear suspension is crucial during the start because it is desirable for the majority of the vehicle weight to be supported by the rear tires equally to ensure straight launches and maximum traction.

Drag racers typically use two types of non-independent rear suspensions to improve the performance of their vehicles. A ladder bar suspension has one connection point forward and two connection points at the rear axle for each of two ladders. The ladder bar suspension allows the rear end to move in an arc having a center at the forward connection point. A four-link suspension has four links, two on each side of the rear differential, connecting the rear axle to the vehicle. The four-link suspension allows the rear end to move in an arc with a center well away from the forward connection points at a point called the instant center.

With both the ladder bar and the four-link suspensions, it is known to use a diagonal crosslink to prevent racking of the suspension. Racking is the sideways movement of the rear end relative to the centerline of the vehicle. The diagonal crosslink has one end attached to one front connection point and the other end attached to the rear axle housing diagonally opposite the front connection point. The ladders and four-links are arranged in a front-to-back configuration substantially parallel to the longitudinal axis of the vehicle and the crosslink is at an angle to the longitudinal axis, when viewed from above. The diagonal crosslink does not prevent roll or twisting of the rear axle.

It is also known to use an anti-roll bar with these suspensions in order to increase the suspension's roll stiffness, which is its resistance to roll in turns. Anti-roll bars are also called sway bars, anti-sway bars, and roll bars. Anti-roll bars are typically attached to the vehicle and the rear axle housing independent of the ladder bars and four-link suspension components. Drag racing vehicles have little need for anti-roll bars because these vehicles typically travel in a straight line. But, drag racing vehicles have a need for rear suspensions that equalize the loading of each rear tire as power is applied to the tires from the drive chain.

BRIEF SUMMARY OF THE INVENTION

According to one embodiment of the present invention, a rear suspension assembly for a drag racing vehicle is provided. The rear suspension system includes a cross-member located near the medial line of the vehicle, a set of front link plates attached to the cross-member, a set of rear link plates for attaching to the rear axle assembly, four links connecting the set of front link plates to the set of rear link plates, and a brace assembly between the lower two of the four links.

The cross-member is a tubular member that spans the gap between left and right side frame members of the vehicle. In one embodiment, the cross-member is a dropped cross-member, that is, the center portion of the cross-member has an offset to provide clearance for the drive shaft. In another embodiment, the cross-member is integrated into the frame of the vehicle and the four links attach to plates attached to the integral cross-member.

The links are tubular members with rod ends. In one embodiment, the upper links are adjustable, that is, the rod ends have a threaded engagement with the link body. The set of front link plates, in one embodiment, includes four plates, one on each side of a rod end with two rod ends attached to each pair of plates. The set of front link plates, in the embodiment with a separate cross-member, includes a through-opening in which the cross-member fits. A welded connection secures the set of front plates to the cross-member. The set of front link plates includes a plurality of fastener openings to allow the links to be fastened to the link plates at a variety of vertical heights.

The set of rear link plates, in one embodiment, includes four plates, one on each side of a rod end with two rod ends attached to each pair of plates. The set of rear link plates includes a cut-out sized to engage the rear axle housing. The set of rear link plates are adapted to have a welded connection to the rear axle housing. The set of rear link plates includes a plurality of fastener openings to allow the links to be fastened to the link plates at a variety of vertical heights. The plurality of fastener openings in the sets of front and rear link plates allows the location of the instant center (IC) of the links to be adjusted to tune the suspension of the vehicle.

In one embodiment, the brace assembly includes an X-brace positioned between the lower two links and, in one embodiment, includes four members with each member having one end attached near one of the distal ends of the two links and the other end of the four members attached to each other at one point between the two lower links, thereby forming the X-shape of the brace. In another embodiment, a cross-brace spans the two lower links and is attached to the one point connecting the four members of the X-brace.

In another embodiment, the brace assembly includes a Y-brace with a cross-brace connecting the two links with the apex of the Y-brace. At the end of the Y-brace opposite the apex is another cross-brace. In one embodiment, a pair of cross-braces are positioned adjacent the end of the Y-brace opposite the apex. In various embodiments, the cross-braces have a downward bend or curve in the center to allow clearance for the drive shaft.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A rear suspension assembly 200 for a drag racing vehicle is disclosed.

Figure 1:
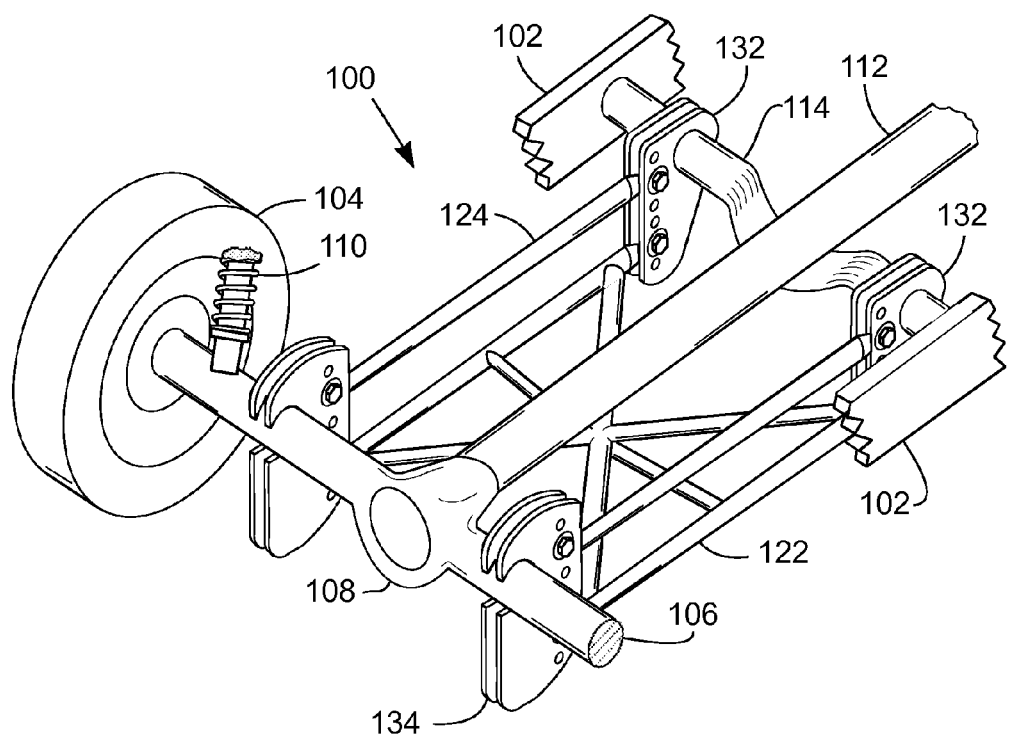
FIG. 1 is a perspective view of one embodiment of the suspension assembly as installed in a vehicle.

FIG. 1 illustrates a perspective view of one embodiment of the rear suspension assembly 100 as installed in a vehicle. The drive system of a vehicle, such as a drag racing vehicle, includes a pair of rear tires 104 connected to rear axles in a rear axle housing 106. For illustration purposes, only a single rear tire 104 is shown in FIG. 1. A rotating drive shaft 112 engages a rear end, or differential, 108 that rotates the rear axles at 90 degrees to the rotation of the drive shaft 112.

In the illustrated embodiment, the rear axle housing 106 is attached to the vehicle by a pair of coil-over-shock assemblies 110. In another embodiment, the coil-over-shocks 110 are attached to the rear link plates 134. In still another embodiment, the rear axle housing 110 is attached to the vehicle with leaf springs. Those skilled in the art will recognize that various spring and shock absorber configurations can be used without departing from the spirit and scope of the present invention.

The rear axle housing 106 is also attached to the vehicle frame 102 by the rear suspension assembly 100. Each end of a cross-member 114 is attached to a frame member 102 of the vehicle. The illustrated cross-member 114 is a dropped cross-member because it has an offset to allow passage of the drive shaft 112. Attached to the cross-member 114 on opposite sides of the offset are two pairs of front link plates 132. In other embodiments, the front link plates 132 are attached to one or more members attached to the frame of the vehicle. The set of front link plates 132 are connected to a set of rear link plates 134 by four links 122, 124. The set of rear link plates are attached to the rear axle housing 106, thereby connecting the rear axle housing 106 to the vehicle frame 102.

Figure 2:
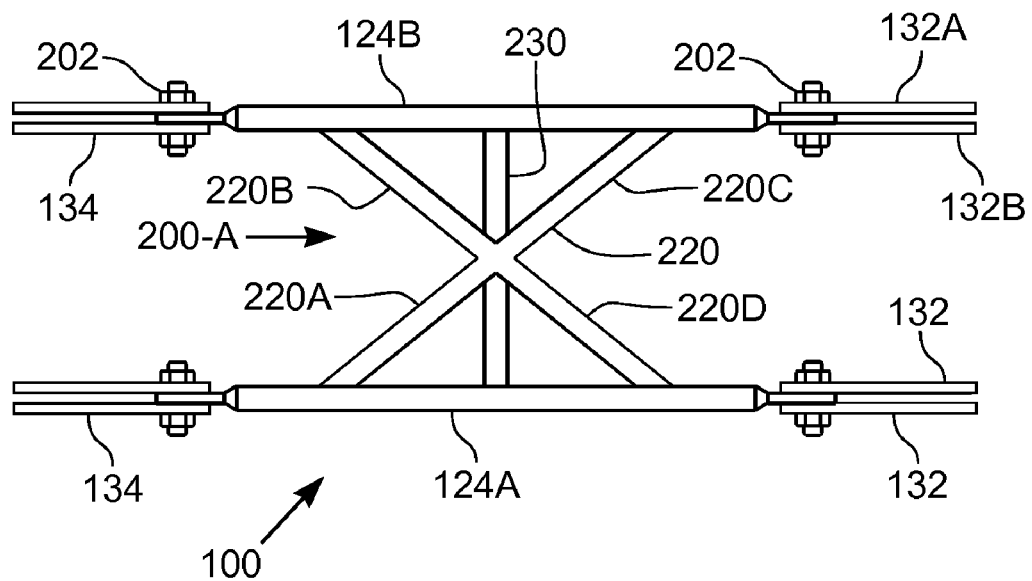
FIG. 2 is a top plan view of one embodiment of the suspension assembly.

FIG. 2 illustrates a top plan view of one embodiment of the rear suspension assembly 100 and the brace assembly 200. The links 122, 124 are tubular members with rod ends. In one embodiment, the rod ends form solid connections, that is, the rod ends do not have flexible bushings as found in street vehicle rod ends. A pair of front link plates 132A, 132B are disposed on opposite sides of a rod end with a fastener 202 connecting the plates 132A, 132B to the link 124B. The connection of the link 122, 124 to the pair of link plates 132, 134 is such that the links 122, 124 pivot about the longitudinal axis of the fastener 202 in a plane parallel to the plates 132, 134. Each one of the pair of lower links 122 is in the same plane as a corresponding one of the pair of upper links 124.

In one embodiment, the upper links 124 have adjustable rod ends. The rod ends at each end of a link 124 have opposing threads such that the link 124 acts as a turnbuckle, that is, the length between the opposing rod ends is varied by rotating the main link member. The adjustable length of the links 124 aids in tuning the rear suspension assembly 100.

Between the pair of lower links 122 and connecting the pair of lower links 122 is a brace assembly 200-A. The brace assembly 200-A maintains the spatial relationship of the two lower links 122. That is, the two lower links 122 both pivot about the longitudinal axis of the fasteners 202 securing the rod ends and the longitudinal axis of the links 122 are constrained to remain perpendicular to the longitudinal axis of the fasteners 202.

In the illustrated embodiment, the brace assembly 200-A includes an X-brace, or a brace with an X-shape, 220 and a cross-brace 230. The X-brace 220 includes four members 220A, 220B, 220C, 220D, each having one end attached to one of the lower links 122 and the other end connected to each other near the mid-point between the lower links 122. The X-brace 220 resembles two V-shaped members with their apexes connected. In one embodiment, the members 220A, 220B, 220C, 220D of the X-brace 220 and the cross-brace 230 are welded to each other and to the links 122. In another embodiment, the X-brace 220 includes one long member 220A, 220C to which two shorter members 220B, 220D are attached. In still another embodiment, the brace assembly 200-A does not include the cross-brace 230.

In the illustrated embodiment, a cross-brace 230 has each end connected to one of the lower links 122. The center of the cross-brace 230 is attached to the connection point of the four members 220A, 220B, 220C, 220D of the X-brace 220. In one such embodiment, a short spacer is positioned between the X-brace 220 and the cross-brace 230.

In one embodiment, the links 122, 124 and the brace assembly 200 are chrome moly tubes 1¼ inch in diameter with a wall thickness of 0.095 inches. In another embodiment, the lower links 122 and the brace assembly 200 are chrome moly tubes 1⅜ inch in diameter with a wall thickness of 0.095 inches, which results in additional strength for resisting twisting and deformation under load. Those skilled in the art will recognize that other materials and sizes of tubing can be used for the links 122, 124 and the brace assembly 200 without departing from the spirit and scope of the present invention.

Figure 3:
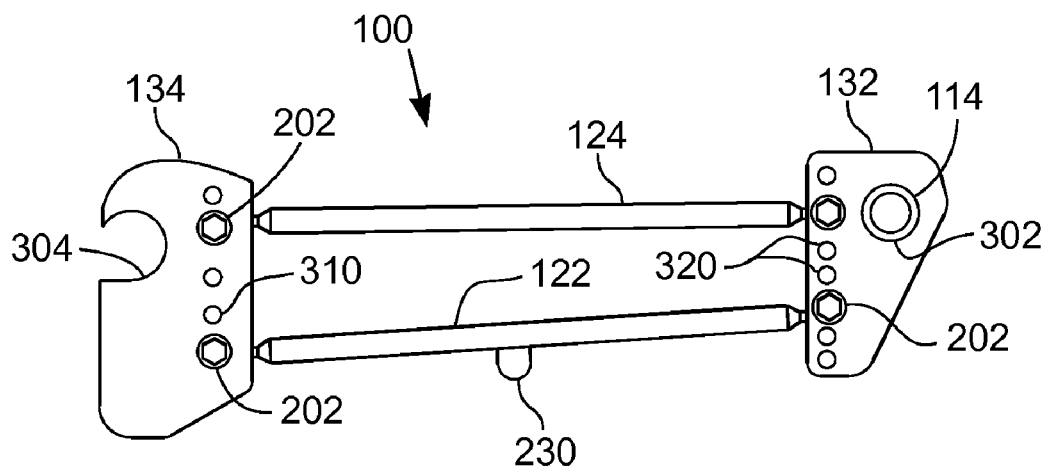
FIG. 3 is a side view of the embodiment of the suspension assembly shown in FIG. 2.

FIG. 3 illustrates a side view of the suspension assembly 100 shown in FIG. 2. Each of the front link plates 132 includes a through-opening 302 into which the cross-member 114 fits. In the illustrated embodiment, the cross-member 114 is welded to the front link plates 132 such that the plates 132 do not rotate about the cross-member 114. In another embodiment, the front link plates 132 are attached to a frame member of the vehicle without the cross-member 114 passing through the link plates 132. Those skilled in the art will recognize that the configuration of the front link plates 122, including the location of the cross-member 114 attachment can vary without departing from the spirit and scope of the present invention.

The front link plates 132 have a series of fastener through-openings 320 for receiving the fasteners 202 securing the links 122, 124 to the front link plates 132. In one embodiment, seven holes 320 are available for positioning the front end of the links 122, 124. The rear link plates 134 have a cut-out 304 for receiving the rear axle housing 106. In the illustrated embodiment, the rear axle housing 106 is welded to the rear link plates 134 such that the plates 134 do not rotate about the rear axle housing 106. Those skilled in the art will recognize that the configuration of the rear link plates 124, including the location of the cut-out 304 can vary without departing from the spirit and scope of the present invention.

The rear link plates 134 have a series of fastener through-openings 310 for receiving the fasteners 202 securing the links 122, 124 to the rear link plates 134. In one embodiment, five holes 310 are available for positioning the rear end of the links 122, 124. The holes 310, 320 in the rear and front link plates 134, 132 allow the links 122, 124 to be adjusted in order to tune the rear suspension assembly 100. Those skilled in the art will recognize that the number and placement of the holes 320, 310 in the front and rear link plates 132, 134, respectively, can vary without departing from the spirit and scope of the present invention. The longitudinal axis of the links 122, 124 intersect at an instant center (IC), which racers use to setup and tune the rear suspension of their vehicles. By connecting the links 122, 124 to holes closer together at the front link plates 132, which results in the upper and lower links 122, 124 forming a smaller angle relative to each other, the instant center is moved rearward. By connecting the links 122, 124 to holes closer to the top of the front link plates 132, the instant center is moved upwards.

Extending from the bottom of the lower links 122 is the cross-brace 230. In one embodiment, the cross-brace 230 forms a shallow V-shape with the lower apex connected to the center point of the X-brace 220. In one such embodiment, a spacer separates and connects the lower apex of the cross-brace 230 to the center point of the X-brace 220. In another embodiment, the cross-brace 230 is bent into a shallow, arcuate shape.

Figure 4:
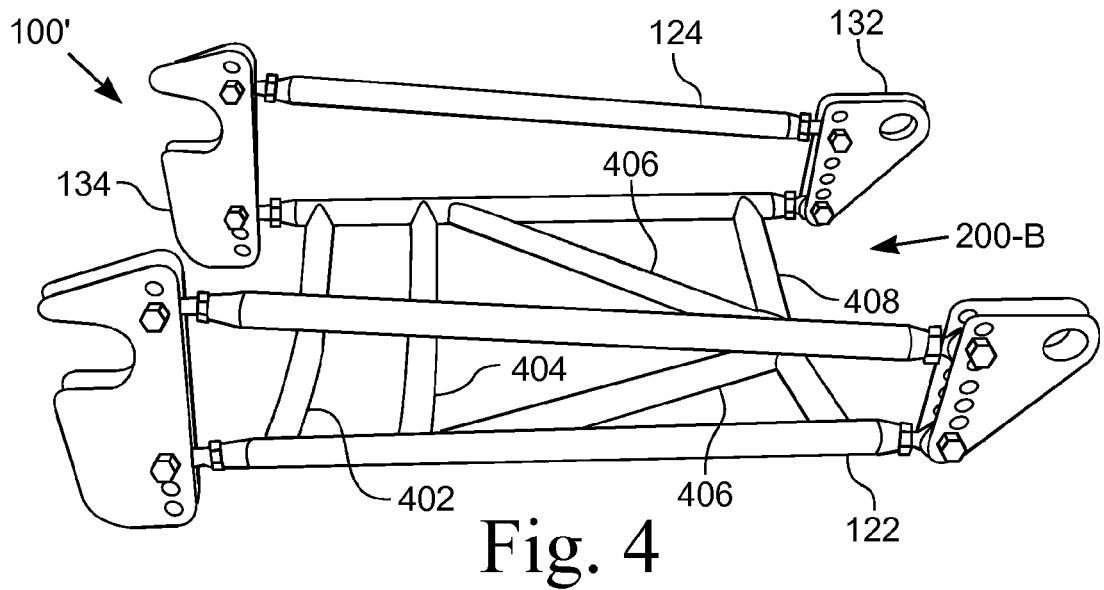
FIG. 4 is a side perspective view of another embodiment of a suspension assembly.

FIG. 4 illustrates a side perspective view of another embodiment of a suspension assembly 100' with a Y-brace assembly 200-B. The Y-brace assembly 200-B includes a Y-shaped member 406 with an apex cross-brace 408 connecting the apex of the Y-shaped member 406 to the lower links 122. The Y-brace assembly 200-B also includes a second cross-brace 404 that is attached to the lower links 122 adjacent the ends of the Y-shaped member 406 opposite the apex. In the illustrated embodiment, a third cross-brace 402 is adjacent the second cross-brace 404 and near the ends of the lower links 122 where they connect to the rear link plates 134.

Figure 5:
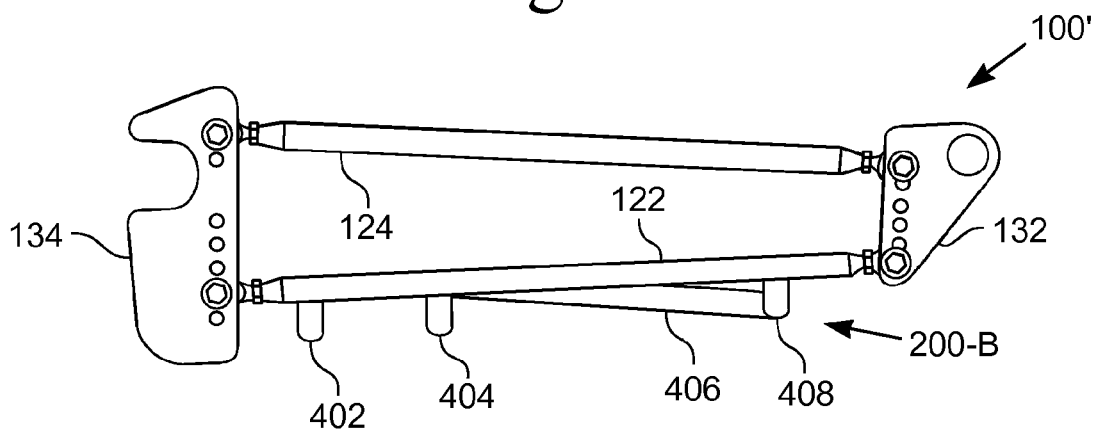
FIG. 5 is a side perspective view of the embodiment of the suspension assembly shown in FIG. 4.

FIG. 5 illustrates a side perspective view of the embodiment of the suspension assembly 100' shown in FIG. 4. In the illustrated embodiment, the cross-braces 402, 404, 408 have a bent or arcuate shape that positions the center point of the cross-braces 402, 404, 408 below the lower links 122. The apex of the Y-shaped brace 406 connects to the mid-point of the apex cross-brace 408 and is also positioned below the lower links 122. Positioning the apex and the midpoints lower than the plane of the lower links 122 provides room for the drive shaft 112 to pass as the suspension assembly 100' articulates during normal operation.

Figure 6:
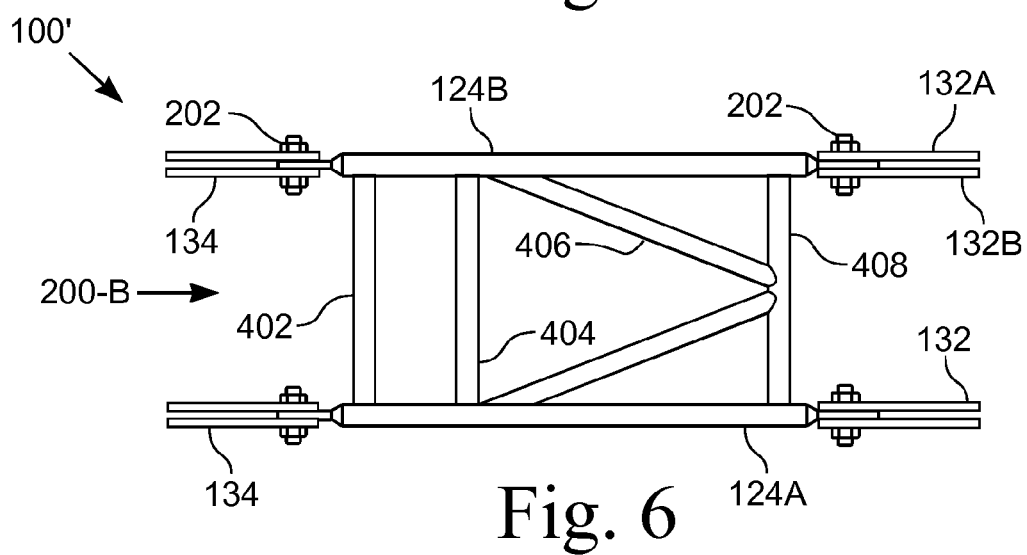
FIG. 6 is a top view of the embodiment of the suspension assembly shown in FIG. 4.

FIG. 6 illustrates a top view of the embodiment of the suspension assembly 100' shown in FIG. 4. In the illustrated embodiment, the V-shaped brace 406 is shown as two separate members with each member having one end connected to the apex cross-brace 408 and the opposite end connected to one of the lower links 122. The second cross-brace 404 is illustrated in a position just rearward of the V-shaped brace 406 and the third cross-brace 402 is illustrated at the end of the lower links 122 adjacent the rear link plates 134.

The rear suspension assembly 100 includes various functions. The function of controlling lateral sway is implemented, in one embodiment, by the brace assembly 200. One embodiment of the brace assembly 200-A includes an X-brace 220 attached to a pair of lower links 122. In one such embodiment, the brace assembly 200-A includes a cross-brace 230 that connects the midpoints of the lower links 122 to the center point of the X-brace 220. In another embodiment, the brace assembly 200-B includes a Y-shaped brace 406 and a plurality of cross-braces 402, 404, 408. The brace assembly 200 maintains the spatial relationship of the lower links 122 and minimizes lateral movement of the rear end of the links 122 relative to the front end of the links 122.

The function of controlling chassis roll is implemented, in one embodiment, by the brace assembly 200. Chassis roll is the tendency for the vehicle to rotate about its longitudinal axis based on engine torque and inertia. The rotation or chassis roll changes the weight distribution between the rear tires 104 such that one rear tire 104 carries more vehicle weight than the other tire 104. During uncontrolled chassis roll, the distance between one side of the rear axle housing 106 to the vehicle chassis 102 increases and the distance between the other side of the rear axle housing 106 to the vehicle chassis 102 decreases. The brace assembly 200 maintains the spatial relationship of the lower links 122 and provides torsional control such that vertical displacement of the rear end of one lower link 122 counteracts the opposite vertical displacement of the rear end of the other lower link 122. The brace assembly 200 eliminates the need for a rear stabilizer or anti-roll bar.

From the foregoing description, it will be recognized by those skilled in the art that a rear suspension assembly 100 for a drag racing vehicle has been provided. The brace assembly 200 adds stability to the rear suspension assembly 100 by preventing or minimizing lateral sway of the rear axle housing 106. The brace assembly 200 eliminates the need for a diagonal link or bar, a panhard bar, a wishbone bar, or other type of anti-sway device for the rear end of a vehicle. These devices, also known as locators, ensure that the rear axle housing 106 does not move laterally relative to the chassis 102, that is, the rear end 108 remains on the centerline of the vehicle. With conventional wishbone bars and various other types of anti-sway devices, moving and/or sliding parts are used. Additionally, many anti-sway devices have attachment points to the rear end housing 106 separate from the attachment of the rear suspension system. The moving parts and different attachment points make these type of anti-sway devices susceptible to binding.

The brace assembly 200 also adds stability to the rear suspension assembly 100 by preventing or minimizing chassis roll or twisting of the rear axle housing 106 relative to the vehicle chassis 102. The brace assembly 200 eliminates the need for a rear stabilizer or anti-roll bar. With conventional anti-roll devices, a torsion bar is attached to the chassis 102 with a pivoting connection. Also, the ends of the conventional anti-roll devices include linkages that connect to the rear end housing 106. The brace assembly 200 is static with no moving parts.

The brace assembly 200 adds rigidity to the rear suspension assembly 100. The lower links 122 are held in fixed spatial relationship relative to each other by the brace assembly 200. The brace assembly 200 prevents lateral displacement of one end of the lower links 122 relative to the other end. Also, the brace assembly 200 prevents opposing vertical displacement of the rear ends of the lower links 122 relative to each other. The static support provided by the brace assembly 200 minimizes flex and tire shake. It also allows for consistent reaction and 60 foot times and straight launches by maintaining equal weight distribution on the rear tires 104.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for stabilizing the rear axle of a drag racing vehicle, said apparatus comprising:
   a first pair of links connecting a vehicle chassis to a rear end housing, said first pair of links including an upper link and a lower link, each end of said upper and lower links having a pivoting connection;
   a second pair of links connecting said vehicle chassis to said rear end housing, said second pair of links including an upper link and a lower link, each end of said upper and lower links having a pivoting connection, said first pair of links connected to said rear end housing on an opposite side of a rear end differential than said second pair of links;
   a first cross-brace having one end connected to said lower link of said first pair of links and an opposite end connected to said lower link of said second pair of links;
   a first diagonal member having a first end connected adjacent a midpoint of said first cross-brace and having a second end connected to said lower link of said first pair of links;
   a second diagonal member having a first end connected adjacent a midpoint of said first cross-brace and having a second end connected to said lower link of said second pair of links, said first and second diagonal members having a substantially V-shaped configuration; and
   a second cross-brace having one end connected to said lower link of said first pair of links adjacent said second end of said first diagonal member, said second cross-brace having an opposite end connected to said lower link of said second pair of links adjacent said second end of said second diagonal member, said second cross-brace and said first and second diagonal member have a substantially triangular shape with an apex of said substantially triangular shape connected to said midpoint of said first cross-brace, said first and second cross-braces and said first and second diagonal members holding said lower link of said first pair of links in a fixed spatial relationship with said lower link of said second pair of links.

2. The apparatus of claim 1 further including a third cross-brace having one end connected to said lower link of said first pair of links and an opposite end connected to said lower link of said second pair of links, said third cross-brace adjacent to an end of said lower links of said first and second pair of links that connects to said rear end housing.

3. The apparatus of claim 1 wherein said first cross-brace has a mid-point located below a plane defined by said lower link of said first pair of links and said lower link of said second pair of links.

4. The apparatus of claim 1 wherein each of said first and second cross-braces have a mid-point located below a plane defined by said lower link of said first pair of links and said lower link of said second pair of links.

5. The apparatus of claim 1 wherein said first cross-brace is adjacent to an end of said lower links of said first and second pair of links that connects to said vehicle chassis.

6. The apparatus of claim 1 wherein said first pair of links are attached to a first one of a pair of front link plates, said second pair of links are attached to a second one of a pair of front link plates, said pair of front link plates attached to a cross-member, said cross-member dimensioned and configured to be attached to said vehicle chassis whereby said first and second pairs of links are connected to said vehicle chassis.

7. The apparatus of claim 1 wherein said upper links of said first and second pair of links each have a length that is adjustable to a selected length.

8. An apparatus for stabilizing the rear axle of a drag racing vehicle, said apparatus comprising:
   a first lower link connecting a vehicle chassis to a rear end housing, each end of said first lower link having a pivoting connection;
   a first upper link connecting said vehicle chassis to said rear end housing, each end of said first upper link having a pivoting connection, said first upper link positioned substantially coplanar with said first lower link;
   a second lower link connecting said vehicle chassis to said rear end housing, each end of said second lower link having a pivoting connection, said first lower link connected to said rear end housing on an opposite side of a rear end differential than said second lower link;
   a first cross-brace having one end connected to said first lower link and an opposite end connected to said second lower link;
   a first diagonal member having a first end connected adjacent a midpoint of said first cross-brace and having a second end connected to said lower first link; and
   a second diagonal member having a first end connected adjacent a midpoint of said first cross-brace and having a second end connected to said second lower link, said first and second diagonal member have a V-shape with an apex of said V-shape connected to said midpoint of said first cross-brace, said first cross-brace and said first and second diagonal members holding said first lower link in a fixed spatial relationship with said second lower link.

9. The apparatus of claim 8 further including a second cross-brace having one end connected to said first lower link adjacent said second end of said first diagonal member, and said second cross-brace having an opposite end connected to said second lower link adjacent said second end of said second diagonal member.

10. The apparatus of claim 9 further including a third cross-brace having one end connected to said first lower link and an opposite end connected to said second lower link, said third cross-brace adjacent to an end of said first and second lower links that connects to said rear end housing.

11. The apparatus of claim 9 wherein each of said first and second cross-braces have a mid-point located below a plane defined by said first lower link and said second lower link.

12. The apparatus of claim 8 wherein said midpoint of said first cross-brace is located below a plane defined by said first lower link and said second lower link.

13. The apparatus of claim 8 wherein said first cross-brace is adjacent to an end of each of said first and second lower links that connects to said vehicle chassis.

14. The apparatus of claim 8 further including a third diagonal member having a first end connected adjacent a midpoint of said first cross-brace and having a second end connected to said second lower link, said third diagonal member substantially coplanar with said first diagonal member; and a fourth diagonal member having a first end connected adjacent a midpoint of said first cross-brace and having a second end connected to said first lower link, said fourth diagonal member substantially coplanar with said second diagonal member, said first, second, third, and fourth diagonal members having an X-shape configuration.

15. The apparatus of claim 8 wherein said first lower link and first upper link are attached to a first one of a pair of front link plates, said second lower link is attached to a second one of a pair of front link plates, said pair of front link plates attached to a cross-member, said cross-member dimensioned and configured to be attached to said vehicle chassis.

16. The apparatus of claim 8 wherein said first upper link is an adjustable link wherein a length of said first upper link is adjustable to a selected length.

17. The apparatus of claim 8 further including a second upper link connecting said vehicle chassis to a rear end housing, each end of said second upper link having a pivoting connection, said second upper link positioned substantially coplanar with said second lower link.

18. An apparatus for stabilizing the rear axle of a drag racing vehicle, said apparatus comprising:
- a pair of front link plates configured to attach to a vehicle;
- a pair of rear link plates attached to a rear axle housing, each one of said pair of rear link plates on opposites sides of a rear differential;
- a first lower link having a first end pivotably connected to a first one of said pair of front link plates and a second end pivotably connected to a corresponding one of said pair of rear link plates;
- a first upper link having a first end pivotably connected to a first one of said pair of front link plates and a second end pivotably connected to a corresponding one of said pair of rear link plates, said first upper link positioned substantially coplanar with said first lower link;
- a second lower link having a first end pivotably connected to a second one of said pair of front link plates and a second end pivotably connected to a corresponding one of said pair of rear link plates;
- a second upper link having a first end pivotably connected to a second one of said pair of front link plates and a second end pivotably connected to a corresponding one of said pair of rear link plates, said second upper link positioned substantially coplanar with said second lower link;
- a first cross-brace having one end connected to said first lower link and an opposite end connected to said second lower link;
- a first diagonal member having a first end connected adjacent a midpoint of said first cross-brace and having a second end connected to said lower link of said first pair of links; and
- a second diagonal member having a first end connected adjacent a midpoint of said first cross-brace and having a second end connected to said lower link of said second pair of links.

19. The apparatus of claim 18 further including a second cross-brace having one end connected to said first lower link adjacent said second end of said first diagonal member, and said second cross-brace having an opposite end connected to said second lower link adjacent said second end of said second diagonal member, said first and second cross-braces and said first and second diagonal members fixing said first lower link in a fixed spatial relationship with said second lower link.

20. The apparatus of claim 18 further including a third diagonal member having a first end connected adjacent a midpoint of said first cross-brace and having a second end connected to said second lower link, and a fourth diagonal member having a first end connected adjacent a midpoint of said first cross-brace and having a second end connected to said first lower link, said first, second, third, and fourth diagonal members having a substantially X-shape configuration.

* * * * *